United States Patent [19]
Blemberg et al.

[11] Patent Number: 5,106,562
[45] Date of Patent: Apr. 21, 1992

[54] EXTRUSION METHODS AND APPARATUS

[75] Inventors: Robert J. Blemberg, Appleton; John P. Eckstein, Neenah, both of Wis.

[73] Assignee: American National Can Company

[21] Appl. No.: 458,486

[22] Filed: Dec. 28, 1989

[51] Int. Cl.⁵ .............................................. B29C 47/06
[52] U.S. Cl. ................................... 264/171; 264/40.6; 264/173; 264/327; 425/131.1; 425/133.5; 425/144; 425/462
[58] Field of Search ............... 264/171, 173, 514, 40.6, 264/327; 425/131.1, 133.1, 133.5, 378.1, 379.1, 461, 462, 144

[56] References Cited

U.S. PATENT DOCUMENTS

| | | | |
|---|---|---|---|
| 3,415,920 | 12/1968 | Lee et al. | 264/171 |
| 3,635,624 | 1/1972 | Nakakoshi et al. | 425/378.1 |
| 3,707,590 | 12/1972 | Wiggins et al. | 264/514 |
| 3,933,964 | 1/1976 | Brooks | 264/171 |
| 3,949,042 | 4/1976 | Utz | 264/173 |
| 3,980,744 | 9/1976 | Cogswell | 264/173 |
| 4,053,270 | 10/1977 | Collier et al. | 425/379.1 |
| 4,216,253 | 8/1980 | Bonnebat et al. | 425/378.1 |
| 4,379,117 | 4/1983 | Baird, Jr. et al. | |
| 4,484,883 | 11/1984 | Honda et al. | 264/40.6 |
| 4,798,526 | 1/1989 | Briggs et al. | 425/462 |
| 4,804,510 | 2/1989 | Leucke et al. | |
| 4,842,791 | 6/1989 | Gould et al. | |

FOREIGN PATENT DOCUMENTS

| | | |
|---|---|---|
| 149321 | 7/1985 | European Pat. Off. . |
| 323043 | 7/1989 | European Pat. Off. . |
| 340655 | 11/1989 | European Pat. Off. . |
| 345987 | 12/1989 | European Pat. Off. . |
| 2182602A | 1/1986 | United Kingdom ............. 425/378.1 |
| 2182602 | 5/1987 | United Kingdom . |

Primary Examiner—Jeffery Thurlow
Attorney, Agent, or Firm—Robert A. Stenzel

[57] ABSTRACT

Methods and apparatus for reducing the impact of a higher temperature polymeric melt stream element on a lower temperature polymeric melt stream element, and vice versa. The methods include: supercooling the hotter melt stream element, exposing one or more melt stream elements to an undesirable thermal condition for a limited period of time, and/or using one or more layers as a heat sink. The apparatus is provided by a modified die in which one of the melt stream elements having the disparate temperatures traverses the die in a foreshortened path in the direction of extrusion of the extrudate.

31 Claims, 6 Drawing Sheets

EXTRUSION METHODS AND APPARATUS

BACKGROUND OF INVENTION

This invention relates to methods and apparatus for fabricating polymeric articles, including single layer and multiple layer structures.

As used herein, "structures" means and includes single and multiple layer films, single and multiple layer sheets, and packages, including, by way of example, pouches, trays, lid stock, containers and the like made with those films and sheets.

The invention especially relates to the extrusion of a first polymeric composition which is sensitive to the thermal conditions to which it is exposed, at a first set of thermal conditions with a second polymeric composition which is preferably processed at a second set of more intense thermal conditions (e.g., higher temperature). A problem with respect to the type of extrusion to which this invention relates is that when the second set of conditions is sufficiently intense, the first polymeric composition can be adversely affected, e.g., changed or degraded, by use of conventional extrusion methods.

Vinylidene chloride copolymers (VDC) provide a barrier to transmission of moisture vapor and oxygen, and therefore are desirable for use when those properties are important. Since coextruding of a plurality of polymeric melt streams, in a desired relative structural relationship, at a single die exit is commonly practiced, it would be desirable to coextrude VDC with a wide variety of other polymeric compositions.

U.S. Pat. No. 3,558,330 Widiger et al relates to simultaneous extrusion of VDC with other polymeric materials. They include a table of suggested structures, at least one of which, namely MYLAR, cannot be "coextruded" because it is already in film form.

However, it is well known that VDC is sensitive to the thermal conditions to which it is exposed, see subsequent U.S. Pat. No. 4,379,117 to Baird Jr. et al. Baird Jr. et al suggest hollow cavities in the die, to be filled with circulating liquids at the temperature required to protect the VDC from overheating.

It is an object of this invention to provide other, and additional, means for reducing the impact of the higher temperature of the second polymeric melt stream element on the VDC, or other sensitive melt stream elements e.g., ethylene vinyl alchohol or nylon which are also temperature sensitive.

It is a more specific object to provide a method which comprises supercooling one or more of the melt stream elements.

Another specific object is to provide a method wherein the hotter melt stream element is joined with a melt stream element which is below the recrystallization temperature of the hotter melt stream element, and preferably extruding the joined melt stream before adverse change is manifested in the hotter melt stream element.

Still another specific object is to provide a heat sink as one of a plurality of melt stream elements.

Yet another specific object is to provide a modified die, and method of use, wherein the length of one of the paths in the die, in the direction of extrusion of the extrudate, is shorter than the length, in the same direction of the path traversed by another layer

SUMMARY OF THE INVENTION

The invention is embodied in methods of extruding. In one family of such methods the steps of the method comprise heating a polymeric composition having a melting temperature and a recrystallization temperature, below the melting temperature and thereby forming a first melt stream element with the polymeric composition, such that the melt stream has a temperature at least as great as the melting temperature, supercooling the first melt stream element to a temperature below the melting temperature and above the recrystallization temperature, and extruding the supercooled melt stream element, through a die.

The method, as applied in some embodiments, includes supplying a plurality of polymeric melt stream elements to the die, joining the plurality of melt stream elements to make a joined melt stream, and extruding the joined melt stream through the die, and including supercooling at least one of the plurality of melt stream elements prior to exiting of the joined melt stream from the die.

In other embodiments, one of the melt stream elements comprises vinylidene chloride copolymer and at least one of the plurality of melt stream elements except the vinylidene chloride copolymer melt stream element is supercooled.

In some embodiments, the method includes joining the first polymeric melt stream element, after the supercooling step, with a second polymeric melt stream element, to make a joined melt stream having the corresponding first and second melt stream elements, and wherein the second melt stream element, at the locus of the joining, has a temperature less than the recrystallization temperature of the first polymeric composition, whereby the thermal dynamics of the joining can change the properties manifested by the first and second melt stream elements of the joined melt stream. The joined melt stream is then extruded from the die, preferably before the thermal dynamics set in motion at the joining are manifested as adverse change in either of the first and second melt stream elements.

Preferred embodiments of the method include the step of encapsulating the vinylidene chloride copolymer melt stream element in a second encapsulating polymeric melt stream element to form a combined melt stream, and subsequently joining the combined melt stream with at least one other of the plurality of melt streams.

In some embodiments, the method includes providing as the die, a die comprising (i) first and second inlets, (ii) an outlet, and (iii) first and second paths respectively extending between the outlet and respective ones of the first and second inlets, the first and second paths being adapted to join respective first and second polymeric melt stream elements to each other in the die to thereby make a joined melt stream, and to extrude the joined melt stream from the die at the outlet in a definable direction, the first path comprising a first length component in the direction of extrusion, the second path comprising a second length component in the direction of extrusion, the second length component being no more than 50%, preferably no more than 33⅓%, more preferably in some embodiments no more than 25%, as great as the first length component.

The invention can separately be defined as a method of extruding wherein the steps comprise heating a first polymeric composition having a melting temperature and a recrystallization temperature, to a temperature above the melt temperature and thereby forming a first melt stream element with the polymeric composition such that the first melt stream element has a temperature at least as great as the melting temperature; forcing the first melt stream element through the die in such a configuration that the first melt stream element has a surface, and extruding the first melt stream element from the die; and, prior to the extrusion of the first melt stream element from the die, joining the surface of the first melt stream element with a second melt stream element to thereby make a joined melt stream comprising corresponding first and second melt stream elements, the temperature of the second melt stream element at the joining being less than the recrystallization temperature of the first polymeric composition. Where the thermal dynamics of the joining can change the properties manifested by the first and second melt stream elements, the joined melt stream is preferably extruded from the die before the thermal dynamics set in motion at the joining are manifested as adverse change in either of the first and second melt stream elements.

In still other embodiments, the method comprises the steps of feeding a first polymeric melt stream element into and through an extrusion die at a first set of thermal conditions, the first polymeric melt stream element being sensitive to the temperature to which it is exposed; feeding a second polymeric melt stream into and through the extrusion die at a second set of thermal conditions different from the first set, the first melt stream being intolerant of prolonged exposure, in the die, to the second set of thermal conditions; feeding a third polymeric melt stream element into and through the extrusion die at a third set of thermal conditions, and imposing the third melt stream element between the first and second melt stream elements; joining the first, third, and second melt stream elements to each other respectively, to make a combined melt stream, the third melt stream element being cooler than the second melt stream element at the joining, and being adapted to function as a heat sink between the first and second melt stream elements. Thus, the third melt stream element temporarily maintains a temperature gradient between the first and second melt stream elements such that the thermal conditions to which the first melt stream element is exposed are tolerated by the first melt stream element. The combined melt stream is then extruded from the die before the thermal conditions to which the first melt stream element is exposed become intolerable to the first melt stream element.

The above method is especially useful in embodiments wherein the first polymeric melt stream element comprises a vinylidene chloride copolymer composition, and wherein the joining comprises two steps, namely (i) encapuslating the first polymeric melt stream element in a fourth polymeric melt stream element to make an encapsulate melt stream, and subsequently (ii) joining the encapsulate melt stream, the third melt stream element, and the second melt stream element respectively to each other. With respect to vinylidene chloride copolymers, and ways of obtaining products from polymers, reference is made to commonly owned and concurrently filed application Ser. Nos. 07/458,485, 07/458,483, 07/458,487, 07/458,490, and 07/458,488, all filed Dec. 28, 1989 each of which being hereby incorporated herein by reference.

In preferred embodiments of this invention, cooling means is provided in the extrusion die proximate the third melt stream element, and thereby controls the temperature of the third melt stream element prior to the joining of the second and third melt stream elements. Preferably, the method comprises applying the cooling means to the third melt stream element and thereby controlling the temperature of the third melt stream element, essentially up to the locus of joinder of the second and third melt stream elements.

Where the first and second set of thermal conditions are sufficiently different, and wherein it is desirable to maintain that difference, or a similar difference, the method can include providing heating means in the die proximate the second melt stream element, and thereby (i) controlling the temperature of the second melt stream element and accordingly (ii) controlling the temperature differential between the second and third melt stream elements prior to the joining of the second and third melt stream elements.

In large part, the invention generically relates to reducing the impact of the sensitivity of a melt stream composition to the thermal conditions attendant a second melt stream element with which it is coextruded. Another embodiment of the method thereof comprises heating a first polymeric composition, having a first melting temperature, above the first melting temperature, and plasticating the first polymeric composition to thereby form a first melt stream element; heating a second polymeric composition, having a second melting temperature higher than the first melting temperature, and a recrystallization temperature higher than the first melting temperature, to a temperature above the second melting temperature, and plasticating the second polymeric composition to thereby form a second melt stream element; and forcing the first and second melt stream elements into a die at respective first and second inlets, and through the die along said respective first and second paths, and including joining the first and second melt stream elements to each other in the die to form a joined melt stream, and extruding the joined melt stream from the die at an outlet in a definable direction. The first path comprises a first length component in the direction of extrusion, and the second path comprises a second length component in the direction of extrusion, one of the first and second length components being no more than 50% preferably no more than 33⅓%, more preferably in some embodiments no more than 25%, as great as the other of the first and second length components.

The invention separately comprehends the above described die.

DETAILED DESCRIPTION OF THE ILLUSTRATED EMBODIMENTS

As used herein, a melted polymeric stream coming from an individual extruder is referred to as a "melt stream element." The combinations of two or more melt stream elements are referred to as "melt streams."

Figure 1:
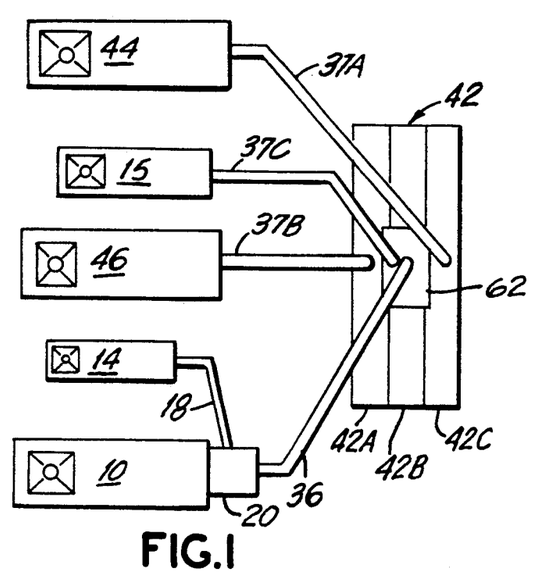
FIG. 1 shows a top view of a layout of an extrusion apparatus system useful in this invention.

Referring to FIG. 1, a first extruder 10 plasticates a representative first polymeric composition which is sensitive to being degraded by the processing conditions. Typically such polymeric compositions contain VDC, such as vinylidene chloride vinyl chloride copolymer or vinylidene chloride methyl acrylate copolymer. Extruder 10 thus produces a first melt stream element 12 seen in FIG. 2. A second extruder 14 plasticates a second polymeric composition and produces a second polymeric melt stream element 16 and delivers it, through a connecting conduit 18, to an encapsulator 20 which is mounted to first extruder 10 by means of a flange 21 (FIG. 2) and appropriate connectors, such as bolts (not shown). Encapsulator 20 feeds transport pipe 36, which connects the encapsulator 20 with feedblock 62. Feedblock 62 feeds die 42. Die 42 has three segments 42A, 42B, and 42C. Feedblock 62 is shown feeding center die segment 42B.

Extruder 44 and 46 feed the two outer segments 42A and 42C of die 42, through transport pipes 37A and 37B respectively. Extruder 15 feeds the second inlet port on feedblock 62 through transport pipe 37C.

Figure 2:
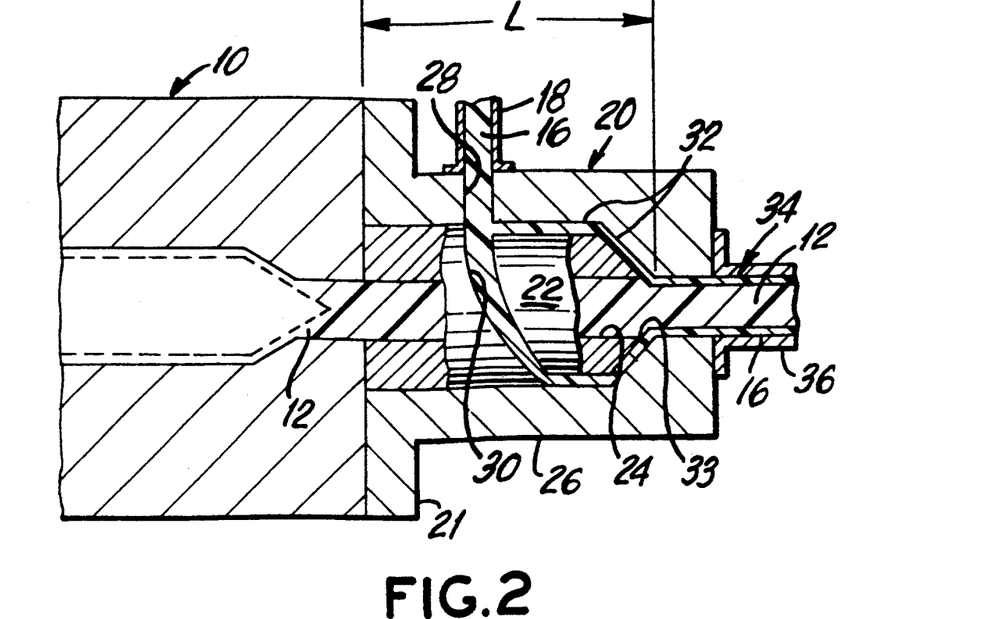
FIGS. 2 and 3 illustrate an encapsulator and its use as part of the apparatus of FIG. 1.
Figure 3:
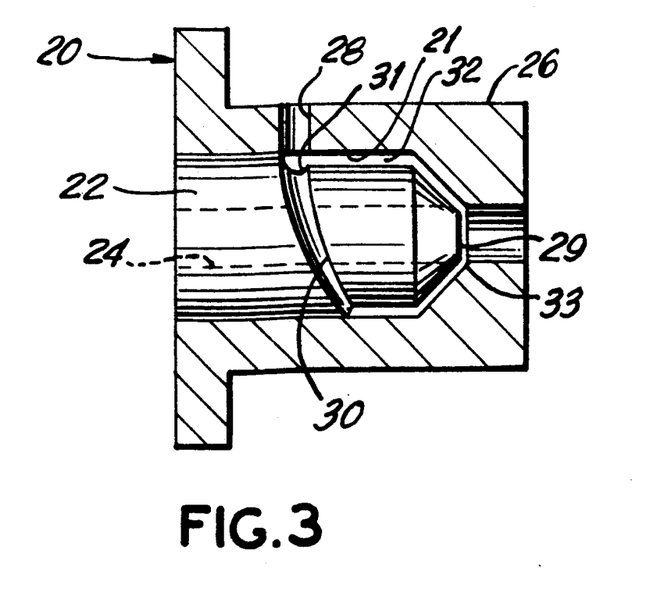

Referring now to FIGS. 2 and 3, encapsulator 20 comprises a crosshead mandrel 22 having a central bore 24 which receives first melt stream element 12 from extruder 10. Encapsulator 20 further comprises a sleeve 26 surrounding mandrel 22. Sleeve 26 has an inlet passage 28 for passage of the second polymeric melt stream element 16 into the encapsulator 20. Passage 28 leads to a crosshead groove 30 preferably having a tapering cross-section about the circumference of mandrel 22. With the cooperation of the inner surface 27 of sleeve 26, groove 30 distributes polymeric melt stream element 16 about the circumference of mandrel 22 and between mandrel 22 and inner surface 27. Annular channel 32, between the outer surface of mandrel 22 and the inner surface 27 of sleeve 26, extends from groove 30 to the end 29 of mandrel 22, defining an annular upstream portion of channel 32 disposed toward groove 30 and a frustoconical downstream portion disposed toward end 29. The width of channel 32, between mandrel 22 and sleeve 26, approaches a constant with respect to its circumference at any given transverse cross-section of the encapsulator 20.

Channel 32 ends at a joinder 33, where channel 32 joins with central bore 24 at the end 29 of mandrel 22. Channel 32 delivers second polymeric melt stream element 16 to the joinder 33 in an annular configuration having a generally uniform thickness about its circumference, as controlled by the circumferentially uniform distance across channel 32 between mandrel 22 and sleeve 26.

As melt stream element 16 enters crosshead groove 30, it splits, at groove entrance 31, near the top of FIG. 3, into two components and flows around mandrel 22 in radially opposite directions. The melt stream components meet on the opposite side of groove 30, opposite from passage 28, and thereby form a weld line in melt stream element 16.

With both melt stream element 12 and 16 being supplied by their respective extruders 10 and 14 in constant flows of the melt stream elements, melt stream element 12 is thus surrounded by, and encapsulated in, melt stream element 16, at joinder 33. Consequently, a combined melt stream 34 is formed from melt stream elements 12 and 16, wherein the second melt stream element 16 forms a continuous layer about the circumference of, and positioned outwardly of, the first melt stream element 12. Thus, the first and second melt stream elements 12 and 16 maintain their individual identities, and first melt stream 12 is completely surrounded by, and encapsulated in, the second melt stream element 16. The combined melt stream 34 exits encapsulator 20 and enters a transport means which is shown in the illustrated embodiment as transport pipe 36. Transport pipe 36 transports the combined melt stream 34 to feedblock 62.

The encapsulation used in this invention is especially useful in the extrusion of polymers which are sensitive to exposure to metal at the high temperatures which are used in extrusion processing. For example, vinylidene chloride copolymers are sensitive to exposure to temperatures of as little as 290° F. (143° C.) to 320° F. (160° C.), especially when the copolymer is concurrently exposed to the heated metal surfaces of the processing apparatus which is at a similar elevated temperature, as is usually the case with conventional VDC extrusion practice.

Figure 5:
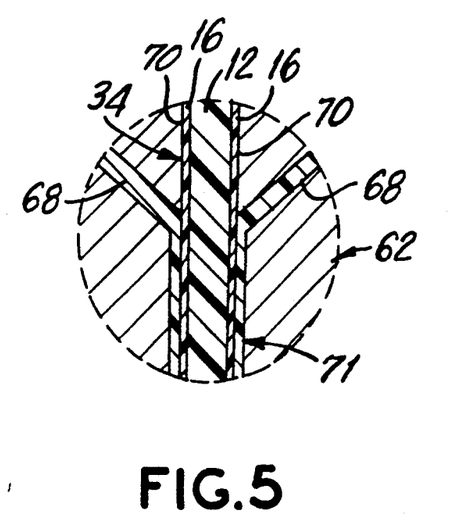
FIG. 5 shows an expanded cross-section of a part of the feedblock of FIG. 1, and is taken at the encircled area 5 of FIG. 4.
Figure 6:
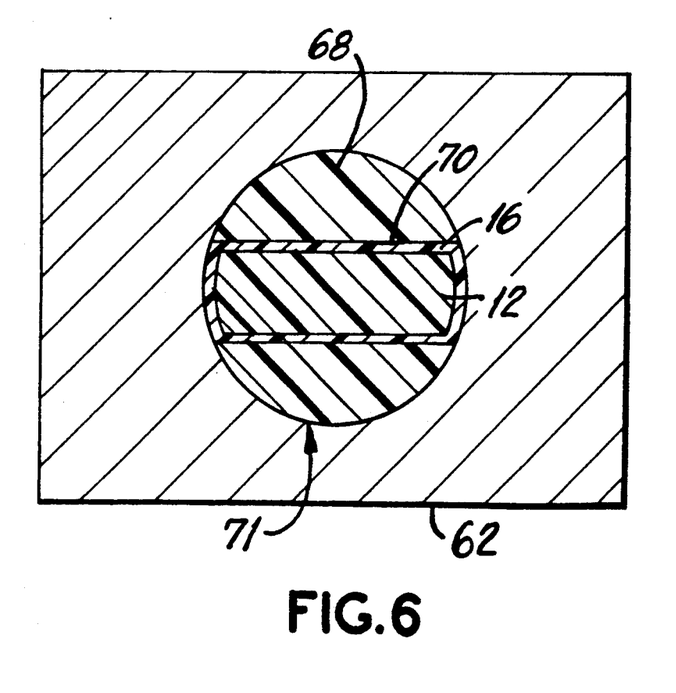
FIG. 6 shows a typical cross-section of the composite melt stream in the feedblock of FIG. 4 and is taken at 6—6 of FIG. 4.

In feedblock 62, third melt stream element 68 from extruder 15 is joined to an outer surface 70 of melt stream element 16, to form composite melt stream 71, as illustrated in FIG. 5. A typical cross-section of composite melt stream 71 in feedblock 62 is shown in FIG. 6.

Figure 4:
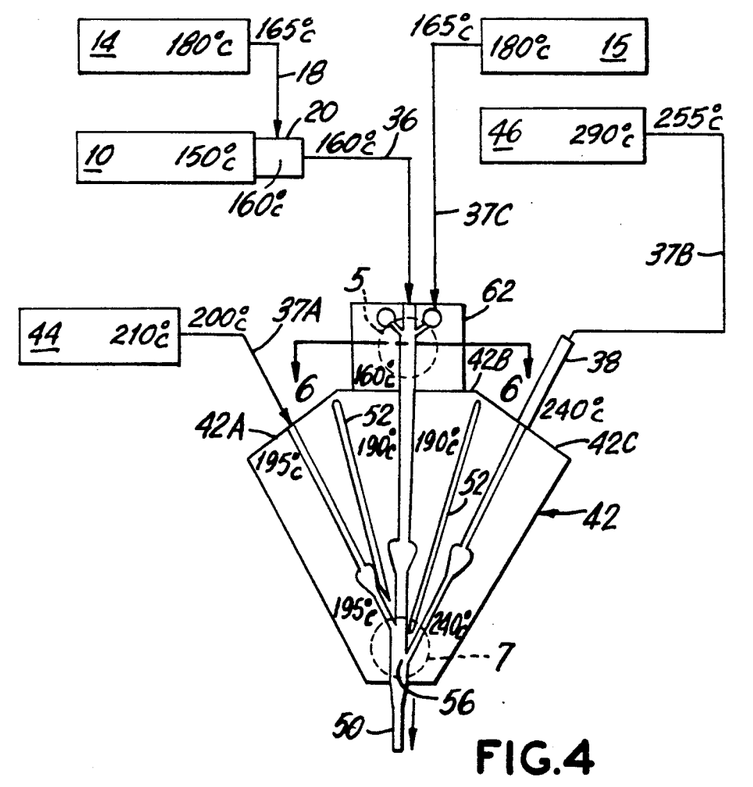
FIG. 4 illustrates typical melt stream temperatures in the several parts of a coextrusion embodiment of the apparatus system, and shows typical cross-section of a cast die and feedblock useful in the invention.

The composite melt stream 71 then passes from feedblock 62 into die 42 as illustrated in FIG. 4. In slot die 42, composite melt stream 71 is lengthened and thinned in the conventional manner as it is shaped in order to conform to the slot a the die exit.

As composite melt stream 71 passes through die 42, and is shaped into an elongated cross-section, it is joined on one outer elongated surface by melt stream element 40 which is plasticized and provided by extruder 44 through transport pipe 37A. See FIGS. 4 and 7. Composite melt stream 71 is joined on its other elongated outer surface by a high temperature melt stream 48 which is plasticated and provided by extruder 46 through transport pipe 37B.

Figure 8:
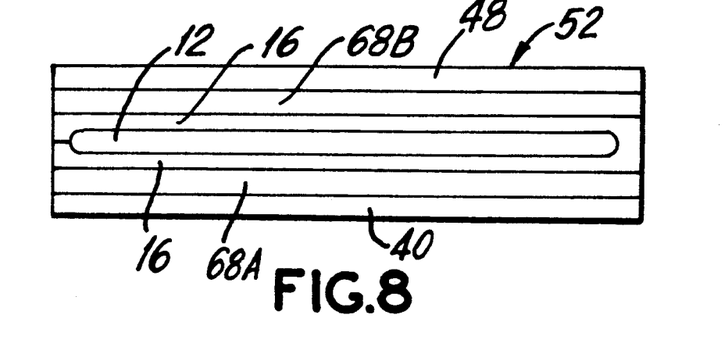
FIG. 8 shows a cross-section of a film of the invention produced with apparatus of FIG. 4.

After melt streams 40 and 48 have been joined to composite melt stream 71, the overall melt stream 50 is expressed from the exit slot of die 42 as a film or sheet, generally represented by film 52 seen in FIG. 8, wherein the layers are numbered with the numbers of the melt streams from which they are derived. Accordingly, FIG. 8 shows two layers 16 and two layers 68, as well as single layers 12, 40 and 48.

As referred to herein, a "high temperature" melt stream element comprises a polymeric composition which is not extrudable to produce acceptable product at the overall thermal process conditions which are acceptable to the polymeric composition of melt stream element 12 after exiting its extruder. Similarly, the composition of melt stream element 12 is not extrudable to produce acceptable product at the overall thermal process conditions which are acceptable to the composition of the high temperature melt stream element. This invention provides apparatus and methods for processing such materials which, in general, require dissimilar processing conditions. The method concepts generally include the categories of (a) supercooling, (b) exposing one or more melt stream, melt stream element, or melt stream component, to an undesirable thermal condition for a limited period of time, and/or (c) using heat sink layer.

In supercooling, one or more of the melt stream elements is cooled to a temperature below its melting temperature but above its recrystallization temperature prior to exiting the die. Each polymer is plasticated in its extruder within this recognized extrusion processing temperature range. The polymer composition which is plasticated to create the high temperature melt stream element 48 is preferably plasticated near the low end of its extrusion processing temperature range, thereby creating the high temperature melt stream element. After the high temperature melt stream element 48 exits its extruder 46, it is supercooled to a temperature below melting temperature and above its recrystallization temperature. The supercooling can be accomplished before entering the die, after entering the die, or in a combination which is partially before and partially during passage through the die. FIG. 4 illustrates a cooling section 38 of transport pipe 37B, wherein the melt stream element is supercooled, and its temperature is thereby controlled, by a temperature-controlled, circulating fluid or simply by transport pipe temperature control set points.

The recrystallization temperature of crystalline or semi-crystalline materials is generally lower than the melting point. Thus the polymer can be heated above its melting point temperature in the extruder to obtain the melt, then supercooled to a temperature below its melting temperature but above its recrystallization temperature and still be maintained in the melt state. Thus, the high temperature polymer (e.g., the PET) in the die can be below its melting point. Examples of melting temperatures and recrystallization temperatures are:

| Material | Minimum Melting Temperature °C. | Recrystallization Temperature °C. |
|---|---|---|
| Polyethylene terephthalate (PET) | 260° | 210° |
| Zytel 42 (Nylon 66) | 258° | 232° |
| Allied 8209 (Nylon 6) | 216° | 188° |
| Dow 2056 (LLDPE) | 129° | 100° |
| Du Pont 3190 EVA based TIE | 88° | 54° |

The recrystallization temperature in this case is defined as the temperature at which the polymer resolidifies as it is cooled below its melting temperature. Supercooling is defined as cooling the melt below its melting point and above it recrystallization temperature.

Cooling the high temperature melt stream element, for example a melt stream element from extruder 46, below its melting temperature before it reaches the die reduces the heat in the die which could potentially contribute to degradation of the more sensitive polymer in melt stream element 12 (e.g. VDC). It also facilitates controlling the die temperature profile, since excess heat is usually available at the die. Usually, the preferred "normal processing temperature" for the sensitive polymer in melt stream element 12 (e.g., VDC), when considered alone, is below the preferred "normal processing temperatures" of any and all of the other melt stream elements, such as 16 and 68.

Thus in some embodiments, all the polymer melt stream elements except the sensitive polymeric melt stream element 12 are cooled below their extruder exit temperature during, or preferably before, passage through the die, in order to reduce the heat stress on the sensitive melt stream element composition. Indeed each of those melt stream elements can be supercooled. The selection of which of the melt stream elements is to be supercooled depends on the compositions of the several melt stream elements, and on the overall operating conditions contemplated. In some cases, only one melt stream element is supercooled. In other cases, more than one melt stream element will be supercooled. Any number of the melt stream elements can be supercooled, up to and including all melt stream elements in some embodiments.

It is critical that no melt stream elements be effectively cooled below its recrystallization temperature while in the die, and stay in the die long enough for recrystallization to take place in the die, as that would stop the extrusion process prematurely. Accordingly, the temperatures in the die are controlled so that the high temperature melt stream stays hot enough to stay melted while in the die. Simultaneously the sensitive polymeric melt stream stays cool enough to avoid degradation.

As seen in FIG. 4, the die 42 includes hollow cavities 52. Cooling fluid is circulated through cavities 52, thereby controlling the amount of heat, if any, which is conducted from melt stream elements 40 and 48 to composite melt stream 71 prior to the joining of those melt stream elements to make the overall melt stream 50.

Figure 7:
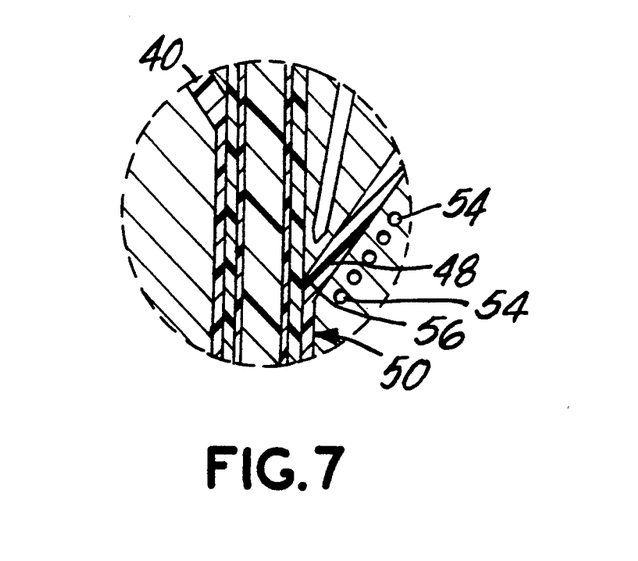
FIG. 7 shows an expanded side cross-section of a part of the die, and is taken at the encircled area 7 of FIG. 4.

Similarly, in order to ensure that high temperature melt stream element 48 maintains sufficient heat to remain fluid, a plurality of heaters 54 are disposed adjacent melt stream element 48, as shown in FIG. 7. By thus controlling the die temperature profile by supplying heat as necessary at heaters 54, and by removing heat as necessary at cooling cavities 52, acceptable and separate thermal operating conditions ca be maintained for the melt stream elements in the several melt stream paths, essentially up to the loci of joinder of the respective melt stream elements.

A melt steam path, as used herein, refers to the internal die passages traversed by a melt stream or melt stream element between its locus of entry into the die, and its locus of exit from the die as part of the overall melt stream 50.

Thus melt steam element 48 is maintained above its recrystallization temperature up to its locus of joinder 56 with composite melt stream 71. Melt steam element 40 is maintained at a desirable temperature up to its locus of joinder with composite melt stream 71. And melt stream 71 is effectively shielded from the different temperatures of melt stream elements 40 and 48, until joined by those melt stream elements respectively, by the cooling effect of fluid in cavities 52.

FIG. 4 diagrammatically illustrates in the invention a typical system arrangement of extruders, feedblocks, and die, and illustrative system temperatures. Die 42 in FIG. 4 is a cross-section with no cross-hatching and only minimal structural detail Thus the temperatures indicated are more readily visualized. The remainder of the system is illustrated diagrammatically.

FIG. 4 illustrates a system arrangement wherein e.g., a VDC copolymer can be coextruded with a high temperature melt stream, while protecting each of the VDC and the high temperature melt stream elements from adverse effects of prologned thermal influence from the other.

The temperatures of the several melt stream elements, which are to be adjacent each other, are controlled such that their melt flow properties (rheologies) are compatible with producing an acceptable flow and pressure drop at, and subsequent to, the joinder of the respective melt stream elements. This achievement of compatible melt rheology between pairs of polymer melt stream elements is accomplished within the thermal parameters acceptable for extrusion processing of each of the corresponding polymer compositions.

Returning to the specific example illustrated in FIG. 4, with reference, by way of example only to specific polymers, extruder 10 processes VDC and has an outlet temperature of about 150° C., and feeds its VDC melt stream element 12 directly into encapsulator 20. Extruder 14 processes an EVA-based polymer and has an outlet temperature of 180° C. It feeds its EVA-based melt stream element 16 to transport pipe 18 which cools melt stream element 16 to 165° C., a temperature below the extrusion processing temperature in extruder 14. Encapsulator 20 is maintained at about 160° C., whereby the melt stream element 16 is cooled below its extruder outlet temperature a further 5° C., and whereby VDC melt stream element 12 is heated about 10° C. above its extruder outlet temperature, but is still maintained within a desirable temperature range. The temperature of the composite melt stream 34 from encapsulator 20 is held at 160° C. in the transfer pipe 36, as it is conducted from encapsulator 20 to feedblock 62.

Continuing, with reference to specific polymers by way of reference only, extruder 15 processes a polymeric material such as a tie or adhesive composition, which adheres well to melt stream element 16 and to the composition of the high temperature melt stream element 48. Extruder 15 can, for example, process the same composition as extruder 14, at the same or similar conditions and deliver its melt stream element 68 to feedblock 62, through pipe 37C, at the same temperature as combined melt stream 34. Composite melt stream 71, after assembly in feedblock 62, is fed into and through die 42.

Again, with reference to specific polymers by way of example only, extruder 44 processes linear low density polyethylene (LLDPE) and has an outlet temperature of about 210° C., as is conventionally practiced in extrusion of LLDPE polymers, and transfers its melt stream element 40 to die 42 through transfer pipe 37A which cools the LLDPE melt stream to about 200° C., as temperature below the extrusion processing temperature in extruder 44.

Similarly, by way of example, extruder 46 processes polyethylene terephthalate (PET) and has an outlet temperature of about 290° C. as is conventionally practiced in extrusion of PET polymers, and transfers its melt stream element 48 to die 42 through transfer pipe 37B. Transfer pipe 37B includes a temperature controlled section 38 which controls the PET melt stream element 48 at 240° C. as it enters the die, at which temperature the PET is supercooled below its melting temperature of 260° C. and above its recrystallization temperature of 210° C.

The main body of die segment 42B is maintained at about 190° C. Die segment 42A is maintained at about 195° C. Die segment 42C is maintained at about 240° C. Temperature controlled fluid in cavities 52 maintains the temperature gradients between die segment 42B and the respective segments 42A and 42C on its opposing sides. Accordingly, the PET melt stream element 48 is hotter than the melt stream 71 containing the VDC, when the melt stream 71 and melt stream element 48 are joined at locus 56.

As exemplified, the VDC copolymer in composite melt stream 71 tolerates the modestly higher temperature of 190° C. in the die because of being protected from direct contact with the die interior surfaces by the covering layers from melt stream elements 16 and 68.

The lower portion of die 42 below joining locus 56 typically is permitted to seek out its own temperature according to the make-up of the temperatures and mass flow rates of the temperature streams feeding into overall melt stream 50. Accordingly, the temperature below locus 56 is at least 190° C., and no more than 240° C., both according to this illustrated embodiment.

So FIG. 4 illustrates the principle of supercooling each of the melt stream elements (preferably representing the precursors of more than two layers), except the VDC copolymer, below their extrusion processing temperatures, and in some embodiments, below their melting temperatures, by the time they pass through the die. It further illustrates the principle of joining with a supercooled polymeric melt, e.g., melt stream element 48, another polymeric melt, e.g., melt steam 71, which is cooler (illustrated at 195° C.) than the recrystallization temperature (210° C. for the PET) of the supercooled polymeric melt.

As illustrated and by way of example, in FIG. 4, the process is set up so that the supercooled PET melt stream element 48 is extruded from the die exit slot shortly after it is exposed to the melt stream whose tmperature is less than the recrystallization temperature of the PET. At the same time the PET is exposed to the cooler melt stream 71, the melt stream 71, containing the VDC melt stream element 12, is exposed to the hotter PET. The VDC tolerates the higher temprature PET because of a plurality of factors which work together to protect it.

First, melt stream 71 is exposed to the higher temperature for only a short period of time before the overall melt stream exits the die and is solidified. In that time period, the temperature differential is absorbed primarily by the intervening melt stream elements 16, and especially 68, whereby temperature equilibrium across the multiple layer melt stream 71 is not believed to be achieved in the die 42. Accordingly, melt stream 71, e.g., the VDC, experiences only a moderate, if any, temperature increase And, since any temperature increase exists for only a short time until cooling begins outside the die, the affect of the increased temperature as to degradation of melt stream 71, e.g., the VDC, is essentially nil.

Second, the encapsulation in the encapsulator 20, and the addition of melt stream element 68 in feedblock 62, combine to physically shield melt stream 71, e.g., the VDC, from contact with the interior surfaces of die 42, whereby its catalysis affect is avoided in the die.

In order for a melt stream element to serve as a heat sink in protecting the VDC, it must be able to absorb a major portion of the extra heat to which it is exposed without passing an unacceptable amount of that heat on to the VDC. A heat sink melt stream element is between the VDC and the higher temperature melt stream element such as PET melt stream element 48. The temperature of the heat sink melt stream, before exposure to the higher temperature, is less than the higher temperature of e.g. melt steam element 48. After exposure, the heat sink melt stream experiences a temperature differential between its two interfacial surfaces. Its mass, in combination with the temperature differential between it and the hotter melt stream element 48, is such that it has sufficient heat absorbing capacity to maintain a temperature at its cooler surface which effectively shields the VDC layer from the effect of the higher temperature. A thin layer which is, e.g., no more than 5% to 7% of the thickness of an extruded film about 2–3 mils thick, such as layer 16, can have a sufficient temperature differential with respect to hotter melt steam element 48, but has insufficient mass to maintain the desired tempeature differential across its layer thickness. Typically, a heat sink layer is at least 0.2 mil (0.005 mm.) thick, preferably at least 0.3 mil (0.008 mm.) thick, and preferably represents about 10% or more of the overall thickness of the extruded film.

In general, the functioning of a heat sink layer is a composite of a number of factors. One factor is the static insulating value of the layer. A second factor is the dynamic time lag between exposure of the heat sink layer to outside heat, and the time required to conduct it to the VDC layer. A third, and related, factor is the heat capacity of the heat sink layer, which itself absorbs and retains some of the heat. The heat sink layer experiences and provides a complex dynamic combination of thermal properties in performing its thermal cushioning function. Desirably, a heat sink melt stream element has the same, or similar, temperature as the sensitive melt stream element at the time it is first exposed to the heat from the higher temperature melt stream element. In FIG. 4, melt stream element 68 meets the above criteria, whereby it provides the heat sink function in that illustrated embodiment. Melt stream element 16 can also be considered as performing a part of the heat sink function, but only in combination with melt stream element 68, since it by itself is too thin. However, two such thin layers, in combination can provide the heat sink function if the combination of their properties satisfies the above parameters.

In order to maintain the desired temperature differential, and to properly condition the temperatures of melt stream elements 68 and 48, and thus to prepare them for their joinder, a temperature barrier is maintained between them by the fluid circulating in cavities 52, whereby melt stream element 16 is maintained cooler; and heating elements 54 are used adjacent melt stream element 48 to maintain its higher temperature.

The PET, having a recrystallization temperature of about 210° C., might be expected to crystallize in the die when it joins the cooler composite melt stream 71 at locus 56. But the 190° C. temperature of composite melt stream 71 is only modestly below the recrystallization temperature of the PET melt stream element. And only a single surface of the PET is exposed to this lower temperature, whereby a temperature differential is set up across the PET melt stream element. Initially, the portion disposed closer to heaters 54 maintains its previous temperature whereby it has no tendency to crystallize. However, at least a portion of melt stream element 48 which is disposed toward melt stream element 68 is, below its recrystallization temperature whereby at least in theory, the recrystallization process is set in motion.

As with the effect on composite melt stream 71, the PET exits the die before the thermal dynamics set in motion at joining locus 56 (recrystallization of PET) are manifested in unacceptable changes in the melt stream flow. The change in PET would be a physical change, namely recrystallization. And, after exiting the die, the recrystallization is acceptable, indeed desirable, as part of the process of solidifying the melted extrudate. The change in VDC at joinder locus 56 would be a chemical change, namely polymer degradation. After exiting the die, the cooling step essentially eliminates the tendency toward degradation.

Thus, the heating of the VDC copolymer, and the cooling of the PET, both of which are begun at joining locus 56, are tolerated by the respective copolymers because of (i) the short time interval between the joining of their respective polymer melts, to make overall melt stream 50, and their exiting of the die, along with the accompanying cooling of the so-extruded polymers, and (ii) the time lag between the initiation of change at locus 56 and the manifestation of effects in the polymers of melt stream 50.

During the time after which the melt stream elements pass joinder 56 and before they exit the die, the difference in the temperatures of the melt stream elements becomes less, as hotter melt stream element 48 gives up heat to cooler melt stream 71, whereby each melt stream element experiences a non-preferred, or less preferred, temperature. This is tolerated because the time of such exposure is short, such as about 1–3 seconds. Once the extrudate leaves the die, the acquired less preferred temperatures are less critical, as the cooling and solidification commences immediately thereafter.

In general, it is beieved that the physical shielding of the thermally sensitive polymers such as VDC compositions from direct physical contact with the interior surfaces of the processing apparatus provides the technical foundation of opportunity for coextrusion of such temperature sensitive polymer (e.g.) VDC, with polymers requiring disparate, and especially higher, extrusion processing temperatures. The shielding can be performed by a total encapsulation process as at encapsulator 20, or by a partial encapsulation process as taught in, for example, application Ser. No. 07/140,096 and application Ser. No. 07/204,485, herein incorporated by reference. The fraction of the surface of the melt stream of the temperature sensitive polymer (e.g., VDC) which is shielded from contact with the internal apparatus surfaces is illustrated in Ser. No. 140,096 as about 80% at some locations, although the overall fraction beyond the VDC extruder and feedblock is closer to 95%. A minimum of 70% shielding at any location beyond the feedblock is usually necessary to achieve effective use of the shielding function.

Table 1 illustrate exemplary structures corresponding to the cross-section of structures which can be successfully coextruded using this invention. From within Table 1, those of ordinary skill in that art, following reasonable and usual practices, will be able to select combinations of compositions for the two surface layers. Each listed polymer is in fact a family of polymers. Two or more members listed for a given layer can be mixed together. Further, each listed family is representative of the dominant polymer. Selection of specific polymers for an adhesive layer is, of course, dependent on bonding properties with respect to the compositions selected for the adjacent layers. With respect to adhesion between layers, reference is made to commonly owned and concurrently filed U.S. application Ser. No. 07/458,489, filed Dec. 28, 1989 which is hereby incorporated herein by reference. Most of the well known extrudable adhesives bond satisfactorily to VDC copolymers, especially, vinylidene chloride methyl acrylate copolymer. The bonding properties of extrudable adhesive polymers with respect to the polymers listed for layers 40 and 48 are fairly well known; thus the suitability of a given combination of layer compositions can be confirmed through routine confirmation testing The layer numbering in Table 1 corresponds to the layer numbering in FIG. 8.

EXAMPLE 2

A film is fabricated as in EXAMPLE 1 except that layer 40 is polypropylene.

EXAMPLE 3

A film is fabricated as in EXAMPLE 1 except that layer 48 is nylon 66, and layer 40 is SURLYN 1652 ionomer (Du Pont).

Heat is readily driven through the films of EXAMPLES 1-3 in fabrication of heat seals. With respect to sealant blends, reference is hereby made to commonly owned and concurrently filed application Ser. No. 07/458,489, filed Dec. 28, 1989 which is hereby incorporated herein by reference.

Figure 9:
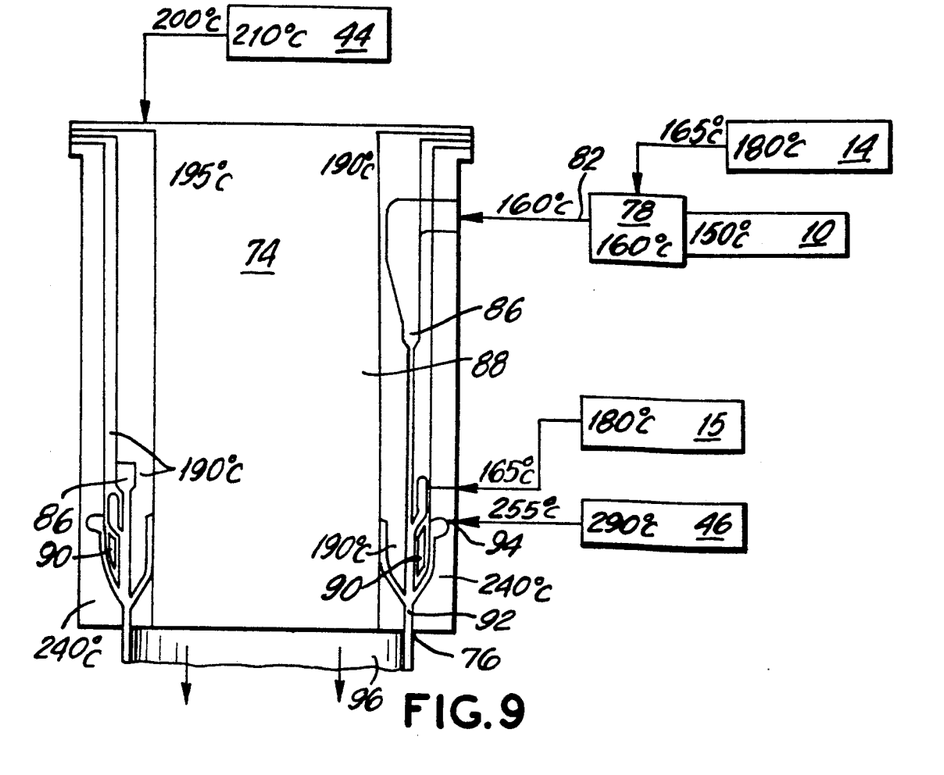
FIG. 9 illustrates typical melt stream temperature in the several parts of a tubular coextrusion embodiment of the apparatus system, and shows typical cross-section of a tubular die useful in the invention.

Another method of shortening the time during which the respective melt stream elements are exposed to each other's disparate processing temperatures is to reduce the time during which one of the respective melt stream elements (e.g. melt stream elements 12 or 48) is in the die. FIG. 9 represents such a process, wherein the exemplary PET melt stream 48 enters die 74 rather close to the locus of exit 76.

TABLE 1

| Layer 40 | Layer 68A | Layer 16 | Layer 12 | Layer 16 | Layer 68B | Layer 48 |
| --- | --- | --- | --- | --- | --- | --- |
| ULDPE | | | | | | PP |
| LDPE | | | | | | PPE |
| MDPE | Extrudable | EVA | VDC | EVA | Extrudable | Polyamide |
| HDPE | Adhesive | EMA | preferably | EMA | Adhesive | Copolyester |
| LLDPE | and blends | and | VDC-MA | and | and blends | Polyester |
| LMDPE | thereof | blends | | blends | thereof | Polycarbonate |
| LHDPE | | thereof | | thereof | | HDPE |
| Ionomer | | | | | | and blends thereof |
| EAA | | | | | | |
| EEA | | | | | | |
| EMA | | | | | | |
| EMAA | | | | | | |
| EVA | | | | | | |
| PP | | | | | | |
| PPE | | | | | | |
| Polyamide | | | | | | |
| Polyester | | | | | | |
| Copolyester | | | | | | |
| Polycarbonate | | | | | | |
| and blends thereof | | | | | | |

When both layers 40 and 48 comprise high temperature polymers, additional heaters 54 can be used in die segment 42A.

The following non-limiting examples are given by way of illustration only and are not to be considered limitations of this invention, many apparent variations of which are possible without departing from the spirit or scope thereof.

EXAMPLE 1

A seven layer film is extruded using the system layout, and the approximate temperatures illustrated in FIG. 4. The composition of melt stream element 12 from extruder 10 is vinylidene chloride methylacrylate copolymer. The encapsulating melt stream element 16 is an ethylene vinyl acetate copolymer (EVA) having 28% by weight VA. Melt stream element 68 from extruder 15 is an anhydride modified adhesive EVA. Melt stream element 40 from extruder 44 is a linear low density polyethylene copolymer (LLDPE). Melt stream element 48 from extruder 46 is a polyethylene terephthalate. The resulting film, as extruded, is generally represented by FIG. 8.

FIG. 9 represents a tubular die used in the practice of this invention, corresponding generally in fucntion to the slot die of FIG. 4. The die 74 is a cross-section, but the cross-hatching and some detail have been omitted so that the temperatures indicated are more readily visualized. The remainder of the system is illustrated diagrammatically.

In FIG. 9, extruder 10 processes the sensitive polymer and produces the sensitive melt stream element 12. Extruder 10 has an outlet temperature of about 150° C., and feeds melt stream element 12 directly into a conventional cast extrusion feedblock 78, preferably without an intervening transfer pipe. Feedblock 20 can be directly mounted to extruder 10. Extruder 14 processes a polymeric tie, or adhesive material and produces the melt stream element 16. Extruder 14 has an outlet temperature of 180° C., and transfers melt stream element 16 to feedblock 78 through a transfer pipe which cools the melt stream element to about 165° C. Feedblock 78 is maintained at about 160° C., whereby melt stream element 16 is cooled below its extruder output temperature a further 5° C. and whereby the VDC melt stream element 12 is heated about 10° C. above its extruder output temperature, but is still maintained within an acceptable temperature range.

Figure 10:
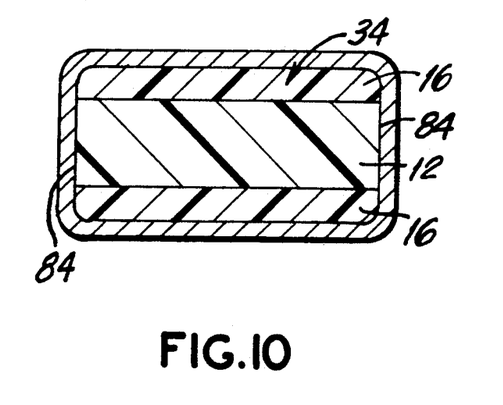
FIG. 10 shows a transverse cross-section of the combined melt stream in the conduit as it leaves the feedblock of FIG. 9.
Figure 11:
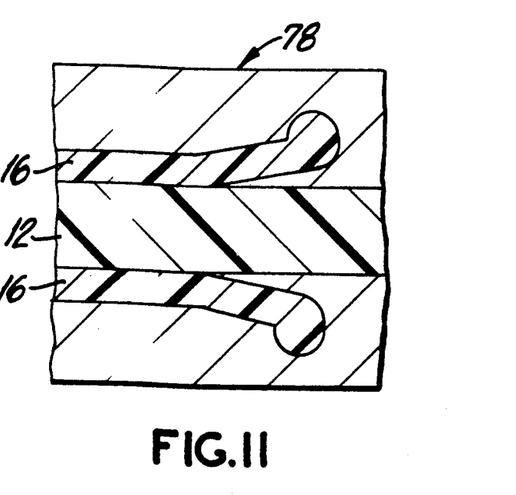
FIG. 11 shows a longitudinal cross-section of the melt stream in the feedblock of FIG. 9.
Figure 12:
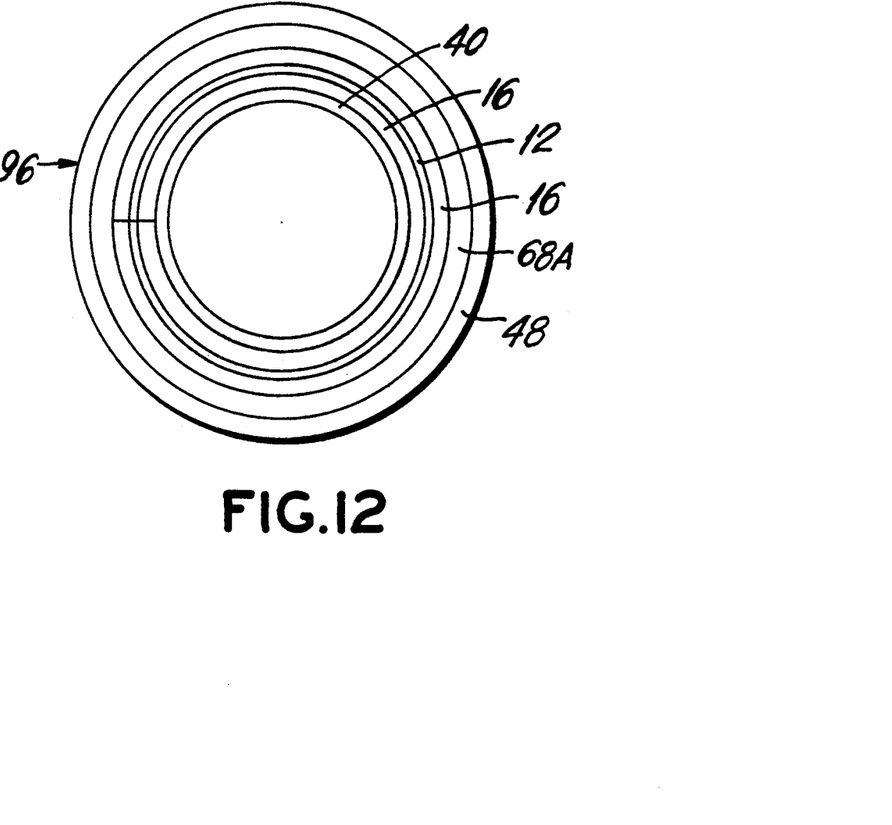
FIG. 12 shows a cross-section of a tubular film as fabricated in the system of FIG. 9.

In feedblock 78, melt stream elements 12 and 16 are combined into a multiple layer melt stream, namely, combined melt stream 34A corresponding to combined melt stream 34 of FIGS. 1-8, except that melt stream element 12 (e.g., VDC) extends to the edges 84 of combined melt stream 34A rather than being encapsulated at the edges. FIG. 11 shows a longitudinal cross-section of the combined melt stream 34 as it is being formed in feedblock 78, wherein the melt stream element 12 (e.g., VDC) positioned between the two outer layers of melt stream element 16. FIG. 10 shows the transverse cross-section of combined melt stream 34 as it leaves feedblock 78 and traverses conduit 82.

A primary purpose of the layers 16 in combined melt stream 34 is to reduce the area of contact between melt stream element 12, e.g., the VDC copolymer and the interior surfaces of the extrusion processing equipment. The temperature of exit melt stream 80 from feedblock 78 is maintained at 160° C., in transfer conduit 82, as it is conducted from feedblock 78 to die 74. The basic covering function by the layers of melt stream element 16 is carried on through die 74, whereby the melt stream element 12, e.g., VDC, is, in general, not in contact with interior die surfaces beyond crosshead groove 86.

Extruder 44 processes, e.g., linear low density polyethylene (LLDPE) and produces a melt stream 40 that conceptually corresponds with layer element 40 of FIG. 8, in that both layers 48 and 40 are adapted to be heat seal layers. Extruder 44 has an outlet temperature of about 210° C., and transfers melt stream element 40 to die 74 through a transfer pipe which cools melt stream element 40 to about 200° C.

Extruder 46 processes e.g., PET and produces a melt stream element 48 that conceptually corresponds with layer 48 of FIG. 8 in that it is an outside abuse resistant and heat resistant layer, as extruded. Extruder 46 transfers its melt stream element 48 to die 74 through a transfer pipe which cools PET melt stream element 48 to about 255° C., which is below the melting temperature of the PET and above its recrystallization temperature.

Extruder 15 processes, e.g., EVA to produce a melt stream element 68A which is positioned between combined melt stream 34 and melt stream element 48 in the die 74. Extruder 15 has an outlet temperature of 180° C. and transfers its melt stream to die 74 through a transfer pipe which cools the EVA to about 165° C.

The main body of the die 74 is maintained at about 190° C. It is closer to about 195° C. near the incoming LLDPE melt stream element 40. Heat controllers maintain the bulk of the balance of die 74 at about 190° C., which is above the typical VDC processing temperature of about 160° C. But the VDC can tolerate some higher temperature in the die because of being protected by covering layers 16 of the tie polymer, as applied in feedblock 78.

The lower portion of mandrel 88 is maintained at about 240° C. in order to maintain the PET polymer in the melt state. But the cooler VDC is shielded from the hotter PET melt stream element by the cooling passage 90, whereby the PET melt stream element 48 is typically hotter than the VDC-containing melt stream when the melt streams are joined as at 92.

Each melt stream and melt stream element traverses a path which is defined between the locus where it enters the die, and where it leaves the die at exit 76. The positioning of the entry of hotter melt steam element 48 into die 74 is relatively important in the embodiment shown. The position is preferably related to the direction of extruding the extrudate 96 from the die. That direction is shown by a pair of arrows at the bottom of FIG. 9. The path traversed by the hotter melt stream element 48, in the direction of expression of the extrudate, is no more than 50% as great as the path traversed by the VDC-containing combined melt stream 34. In some embodiments, the length of the path of the PET melt steam element 48, in the direction of expression, is preferably no more than about 33⅓%, in some embodiments no more than about 25%, as great as the length traversed by melt stream element 12 in the same direction through the die. The same foreshortened path can similarly be used in a similarly modified cast extrusion die, which would be a modification of, e.g., die 42 of FIG. 4.

An example of the melt stream, and film, as produced from die 74 is seen in FIG. 9, wherein layer thicknesses are exaggerated.

Figure 13:
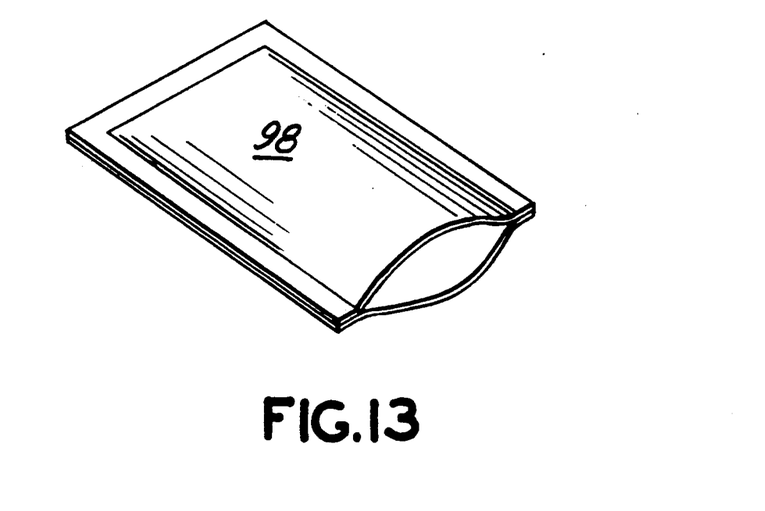
FIG. 13 shows a typical package made with film of the invention, either flat sheet film or tubular film.

The films made according to this invention are suitable for fabrication into packages 98, one of which is seen in FIG. 13, by heat sealing, as is conventionally known. Further, by conventional methods, the films of this invention can also be fabricated into sheets; and, films or sheets of this invention can be formed into any suitable articles, e.g., pouches, trays, lid stock, containers, and the like, by conventional techniques.

Those skilled in the art will now see that certain modifications can be made to the apparatus and methods, and the resulting structures as herein disclosed with respect to the illustrated embodiments, without departing from the spirit of the instant invention.

And while the invention has been described above with respect to its preferred embodiments, it will be understood that the invention is adapted to numerous rearrangements, modifications, and alterations, rearrangements, and modifications are intended to be within the scope of the appended claims.

Having thus described the inventions, what is claimed is:

1. A method of extruding, said method comprising the steps of:
   (a) heating a first polymeric composition, having a melting temperature and a recrystallization temperature below said melting temperature, and thereby forming a first melt stream element with said polymeric composition, such that said melt stream element has a temperature at least as great as said melting temperature;
   (b) supporting said first melt stream element to a temperature below said melting temperature and above said recrystallization temperature;
   (c) joining said first polymeric melt stream element, after said supercooling, with a second polymeric melt stream element, to make a joined melt stream having corresponding first and second melt stream elements; and
   (d) extruding said joined melt stream through a die.

2. The method of claim 1 additionally comprising supplying a plurality of polymeric melt stream elements, including said first and second melt stream elements and joining said plurality of melt stream elements to make the joined melt stream and extruding said joined melt stream through said die.

3. The method of claim 1, additionally comprising supplying a plurality of melt stream elements to said die, the composition of one of said melt stream elements comprising vinylidene chloride copolymer, joining said plurality of melt stream elements to make the joined melt stream, wherein at least one of said plurality of melt stream elements, except the vinylidene chloride copolymer melt stream element is supercooled.

4. The method of claim 1 wherein said second melt stream element, at the locus of said joining has a temperature less than said recrystallization temperature of said first polymeric composition, whereby the thermal dynamics of said joining can change the properties manifested by said first and second melt stream elements of said joined melt stream.

5. The method of claim 2 wherein said second melt stream element at the locus of said joining has a temperature less than said recrystallization temperature of said first polymeric composition, whereby the thermal dynamics of said joining can change the properties manifested by said first and second melt stream elements of said joined melt stream.

6. The method of claim 3 wherein said second melt stream element, at the locus of said joining, has a temperature less than said recrystallization temperature of said first polymeric composition, whereby the thermal dynamics of said joining can change the properties manifested by said first and second melt stream elements of said joined melt stream.

7. The method of claim 4 additionally comprising extruding said joined melt stream from said die before the thermal dynamics set in motion at said joining are manifested as unacceptable adverse change in either of said first or said second melt stream elements 8. The method of claim 5 additionally comprising extruding said joined melt stream from said die before the thermal dynamics set in motion at said joining are manifested as unacceptable adverse change in either of said first or said second melt stream elements.

9. The method of claim 6 additionally comprising extruding said joined melt stream from said die before the thermal dynamics set in motion at said joining are manifested as unacceptable adverse change in either of said first or said second melt stream elements.

10. The method of claim 3, wherein said joining comprises (i) encapsulating said vinylidene chloride copolymer melt stream in a second encapsulating one of said polymeric melt stream elements to form a combined melt stream, and subsequently (ii) joining said combined melt stream with at least one other of said plurality of melt streams.

11. The method of claim 6, wherein said joining comprises (i) encapsulating said vinylidene chloride copolymer melt stream in a second encapsulating one of said polymeric melt stream elements to form a combined melt stream, and subsequently (ii) joining said combined melt stream with at least one other of said plurality of melt streams.

12. The method of claim 9, wherein said joining comprising (i) encapsulating said vinylidene chloride copolymer melt stream in a second encapsulating one of said polymeric melt stream elements to form a combined melt stream, and subsequently (ii) joining said combined melt stream with at least one other of said plurality of melt streams.

13. The method of claim 2 additionally comprising providing as said die, a die comprising (i) first and second inlets, (ii) an outlet, and (iii) first and second paths respectively extending between said outlet and respective ones of said first and second inlets, said first and second paths being adapted to join respective first and second polymeric melt stream elements to each other in said die to thereby make a joined melt stream, and to extrude the joined melt stream from said die at said outlet in a direction, said first path comprising a first length component in said direction of extrusion, said second path comprising a second length component in said direction of extrusion said second length component being no more than 50% as great as said first length component.

14. A method of extruding, said method comprising the steps of:
(a) heating a polymeric composition, having a melting temperature and a recrystallization temperature below said melting temperature, and thereby forming a first melt stream element with said polymeric composition, such that said first melt stream element has a temperature at least as great as said melting temperature and a pair of surfaces;
(b) forcing said first melt stream element through a die and extruding said first melt stream element from said die; and
(c) prior to said extruding of said first melt element stream from said die, joining one of said first melt stream surfaces with a second melt stream element, to thereby make a joined melt stream comprising corresponding first and second melt stream elements, the temperature of said second melt stream element at said joining being less than said recrystallization temperature of said first melt stream element.

15. The method of claim 14 whereby the thermal dynamics of said joining can change the properties manifested by said first and second melt stream elements, and additionally comprising extruding said joined melt stream from said die before the thermal dynamics set in motion at said joining are manifested as unacceptable adverse change in either of said first or said second melt stream elements.

16. A method of extruding, said method comprising the steps of:
(a) feeding a first polymeric melt stream element into and through an extrusion die at a first set of thermal conditions said first polymeric melt stream element being sensitive to the temperature to which it is exposed;
(b) feeding a second polymeric melt stream element into and through said extrusion die at a second set of thermal conditions different from said first set, said first melt stream element being intolerant of prolonged exposure, in said die, to said second set of thermal conditions;
(c) feeding a third polymeric melt stream element into and through said extrusion die at a third set of thermal conditions, and imposing said third melt stream element between said first and second melt stream elements;
(d) joining said first, third, and second melt stream elements to each other respectively, to make a combined melt stream, said third melt stream element being cooler than said second melt stream element at said joining, and being adapted to function, as a heat sink between said first and second melt stream elements, whereby said third melt stream element temporarily maintains a temperature gradient between said first and said second melt stream elements such that the thermal conditions to which said first melt stream element is exposed are tolerated by said first melt stream element; and (e) extruding said combined melt stream from said die before the thermal conditions which said first melt stream element is exposed become intolerable to said first melt stream element and cause excessive degradation thereof.

17. The method of claim 16, wherein the composition of said first polymeric melt stream element comprises a vinylidene chloride copolymer composition, said joining comprises two steps comprising: (i) encapsulating said first polymeric melt stream element in a fourth polymeric melt stream element, to make an encapsulate melt stream, and subsequently (ii) joining said encapsulate melt stream, said third melt stream element, and said second melt stream element respectively, to each other.

18. The method of claim 16 additionally comprising providing cooling means in said extrusion die proximate said third melt stream element, and thereby controlling the temperature of said third melt stream element prior to said joining of said second and third melt stream elements.

19. The method of claim 17 additionally comprising providing cooling means in said extrusion die proximate said third melt stream element, and thereby controlling the temperature of said third melt stream element prior to said joining of said second and third melt stream elements 20. The method of claim 18 additionally comprising applying said cooling means to said third melt stream element, and thereby controlling the temperature of said third melt stream element, until just before the locus of joinder of said second and third melt stream elements.

21. The method of claim 19 additionally comprising applying said cooling means to said third melt stream element, and thereby controlling the temperature of said third melt stream element, until just before the locus of joinder of said second and third melt stream elements.

22. The method of claim 18 additionally comprising providing heating means in said die proximate said second melt stream element, and thereby (i) controlling the temperature of said second melt stream element and accordingly (ii) controlling the temperature differential between said second and third melt stream elements prior to said joining of said second and third melt stream elements.

23. The method of claim 19 additionally comprising providing heating means in said die proximate said second melt stream element, and thereby (i) controlling the temperature of said second melt stream element and accordingly (ii) controlling the temperature differential between said second and third melt stream elements prior to said joining of said second and third melt stream elements.

24. The method of claim 20 additionally comprising providing heating means in said die proximate said second melt stream element, and thereby (i) controlling the temperature of said second melt stream element and accordingly (ii) controlling the temperature differential between said second and third melt stream elements prior to said joining of said second and third melt stream elements.

25. The method of claim 21 additionally comprising providing heating means in said die proximate said second melt stream element, and thereby (i) controlling the temperature of said second melt stream element and accordingly (ii) controlling the temperature differential between said second and third melt stream elements prior to said joining of said second and third melt stream elements.

26. The method of extruding, said method comprising the steps of:

(a) heating a first polymeric composition, having a first melting temperature, above said first melting temperature, and plasticating said first polymeric composition to thereby form a first melt stream element;

(b) heating a second polymeric composition, having a second melting temperature higher than said first melting temperature, and a recrystallization temperature higher than said first melting temperature, to a temperature above said second melting temperature, and plasticating said second polymeric composition to thereby form a second melt stream element; and (c) forcing said first and second melt stream elements into a die at respective first and second inlets, and through said die along respective first and second paths, and including joining said first and second melt stream elements to each other in said die to form a joined melt stream, and extruding said joined melt stream from said die, at an outlet in a direction, said first path comprising a first length component in said direction of extrusion, and said second path comprising a second length component in said direction of extrusion, one of said first and second length components being no more than 50% as great as the other of said first and second length components.

27. The method of claim 26 additionally comprising providing, as said die, a die wherein said one of said first and second length components is no more than 33⅓% as great as the other of said first and second length components.

28. The method of claim 26 additionally comprising providing, as said die, a die wherein said one of said first and second length components is no more than 25% as great as the other of said first and second length components.

29. The die for extruding polymeric compositions, said die comprising:

(a) first and second inlets;

(b) an outlet; and (c) first and second paths respectively extending between said outlet and said first and second inlets, said first and second paths being adapted to join respective first and second polymeric melt stream elements to each other in said die to make a joined melt stream, and to extrude the joined melt stream from said die at said outlet in a direction, said first path comprising a first length component in said direction of extrusion, said second path comprising a second length component in said direction of expression, said second length component being no more than 50% as great as said first length component.

30. The die of claim 29, wherein said second length component being no more than 33⅓% as great as said first length component.

31. The die of claim 29, wherein said second length component being no more than 25% as great as said first length component.

* * * * *